(12) United States Patent
Schmidt

(10) Patent No.: US 11,569,661 B2
(45) Date of Patent: Jan. 31, 2023

(54) MASTERLESS DISTRIBUTED DYNAMIC LOAD MANAGEMENT

(71) Applicant: WATLOW ELECTRIC MANUFACTURING COMPANY, St. Louis, MO (US)

(72) Inventor: Philip S. Schmidt, Decorah, IA (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 17/572,799

(22) Filed: Jan. 11, 2022

(65) Prior Publication Data

US 2022/0224113 A1 Jul. 14, 2022

Related U.S. Application Data

(60) Provisional application No. 63/135,980, filed on Jan. 11, 2021.

(51) Int. Cl.
*H02J 3/00* (2006.01)
*H02J 13/00* (2006.01)

(52) U.S. Cl.
CPC ........ *H02J 3/007* (2020.01); *H02J 13/00036* (2020.01); *H02J 2310/54* (2020.01)

(58) Field of Classification Search
CPC ... H02J 3/007; H02J 13/00036; H02J 2310/54
See application file for complete search history.

(56) References Cited

U.S. PATENT DOCUMENTS

| 4,669,040 A | 5/1987 | Pettit et al. |
| 4,783,647 A | 11/1988 | Wood |

(Continued)

FOREIGN PATENT DOCUMENTS

| CN | 110752600 A | 2/2020 |
| CN | 110994672 A | 4/2020 |

(Continued)

OTHER PUBLICATIONS

International Search Report and Written Opinion issued in corresponding International Application No. PCT/US2022/011902, dated Apr. 26, 2022, 10 pages.

(Continued)

*Primary Examiner* — Carlos Amaya
(74) *Attorney, Agent, or Firm* — Burris Law, PLLC

(57) ABSTRACT

A method of providing power via a plurality of power control systems forming a power network is provided. Each power control system includes a power controller and a power switch operable by the power controller. The method includes defining, by each power controller of the power network, a power allocation schedule for a power cycle using a dynamic load scheduling model based on a members list of the power network. The power cycle is divided into a plurality of power units, and the power allocation schedule identifies one or more designated power control systems from among the plurality of power control systems to provide power to a load during each of the power units. For the power cycle, the method includes providing power to the load by the one or more designated power control systems during a respective power unit based on the power allocation schedule.

20 Claims, 7 Drawing Sheets

(56) References Cited

U.S. PATENT DOCUMENTS

| | | |
|---|---|---|
| 5,093,985 A | 3/1992 | Houldsworth et al. |
| 5,113,398 A | 5/1992 | Howes |
| 5,484,206 A | 1/1996 | Houldsworth |
| 5,544,020 A | 8/1996 | Loeber et al. |
| 5,793,754 A | 8/1998 | Houldsworth et al. |
| 6,441,375 B1 | 8/2002 | Joseph et al. |
| 7,514,815 B2 | 4/2009 | Paik et al. |
| 7,741,730 B2 | 6/2010 | Level et al. |
| 8,918,296 B2 | 12/2014 | Dong et al. |
| 9,042,121 B2 | 5/2015 | Walde et al. |
| 10,211,638 B2 | 2/2019 | Do Rosario et al. |
| 2003/0174471 A1 | 9/2003 | Tonello et al. |
| 2010/0052421 A1* | 3/2010 | Schindler .................. G06F 1/32 307/35 |
| 2011/0276190 A1 | 11/2011 | Lillis et al. |
| 2013/0293994 A1 | 11/2013 | Bellini et al. |
| 2015/0003130 A1 | 1/2015 | Ware |
| 2015/0349524 A1 | 12/2015 | Ichino et al. |
| 2019/0363539 A1 | 11/2019 | Novak et al. |

FOREIGN PATENT DOCUMENTS

| | | |
|---|---|---|
| CN | 111404154 A | 7/2020 |
| CN | 111654067 A | 9/2020 |
| DE | 1911511 U | 3/1965 |
| DE | 202009010833 U1 | 12/2009 |
| DE | 202012006387 U1 | 11/2012 |
| EP | 0226520 A1 | 6/1987 |
| EP | 0285532 A1 | 10/1988 |
| EP | 0408472 A1 | 1/1991 |
| EP | 0723117 A1 | 7/1996 |
| EP | 1126591 A2 | 8/2001 |
| EP | 1155358 A1 | 11/2001 |
| EP | 1615019 A1 | 1/2006 |
| EP | 1916483 A2 | 4/2008 |
| EP | 2747229 A1 | 6/2014 |
| GB | 1441468 A | 6/1976 |
| GB | 2541037 A | 2/2017 |
| JP | 5886407 B1 | 3/2016 |
| TW | 201644133 A | 12/2016 |
| WO | 2004059825 A1 | 7/2004 |
| WO | 2010057458 A2 | 3/2010 |
| WO | 2010088878 A2 | 8/2010 |
| WO | 2010142961 A1 | 12/2010 |
| WO | 2011003374 A2 | 1/2011 |
| WO | 2015102605 A1 | 7/2015 |

OTHER PUBLICATIONS

International Search Report issued in corresponding International Application No. PCT/US2022/011902, dated Apr. 26, 2022, 10 pages.

Search Report issued in corresponding Taiwan Application No. 111101163 dated Sep. 12, 2022, 2 pages.

* cited by examiner

MASTERLESS DISTRIBUTED DYNAMIC LOAD MANAGEMENT

CROSS-REFERENCE TO RELATED APPLICATIONS

This application claims priority to and the benefit of U.S. Provisional Application 63/135,980 filed on Jan. 11, 2021. The disclosure of the above application is incorporated herein by reference.

FIELD

The present disclosure relates to a method and system for managing power to a load using multiple power controllers.

BACKGROUND

The statements in this section merely provide background information related to the present disclosure and may not constitute prior art.

Multiple power controllers, such as zero-crossing alternating current (AC) power controllers, can work in cooperation with one another for providing power to a load under the supervision and control of a master controller. In one exemplary application, the master controller is configured to drive each power controller ON-OFF to draw power from an AC power source. Each ON-OFF operation can cause disturbance in the power being provided. Further, if a power controller is added or removed, the master controller may need to be reconfigured, and if the master controller undergoes service, the power controllers will also be off-line. These and other issues related to power control systems are addressed by the present disclosure.

SUMMARY

This section provides a general summary of the disclosure and is not a comprehensive disclosure of its full scope or all of its features.

In one form, the present disclosure is directed toward a method of providing power via a plurality of power control systems forming a power network. Each power control system includes a power controller and a power switch operable by the power controller. The method includes defining, by each power controller of the power network, a power allocation schedule for a power cycle using a dynamic load scheduling model based on a members list of the power network. The power cycle is divided into a plurality of power units, and the power allocation schedule identifies one or more designated power control systems from among the plurality of power control systems to provide power to a load during each of the power units. For the power cycle, the method further includes providing power to the load by the one or more designated power control systems during a respective power unit based on the power allocation schedule.

In one variation, the method further includes receiving, by each power controller of the power network, a membership command identifying an unassociated power controller to be part of the power network, providing, by at least one power controller of the power network, a current power unit number to the unassociated power controller. The current power unit number is indicative of a power unit of the power cycle currently being performed by the power network, and setting, by the unassociated power controller, a power unit counter of the unassociated power controller to the current power unit number to synchronize the unassociated power controller with each power controller of the power network. The unassociated power controller becomes a member of the members list.

In another variation, the method further includes adding, by each power controller of the power network, the unassociated power controller to the members list of the power network. The power allocation schedule for a subsequent power cycle includes the unassociated power controller as a member of the members list.

In yet another variation, the method further includes receiving, by each power controller of the power network, a removal command from a requesting power controller of the power network, and removing, by each power controller of the power network, the requesting power controller from the members list. The power allocation schedule for a subsequent power cycle does not include the requesting power controller.

In still another variation, the dynamic load scheduling model is based on prefix sum methodology.

In another variation, the method further includes transmitting, by each power controller, an operation setpoint to other power controllers of the power network. The power allocation schedule is further defined based on the operation setpoint of each power controller.

In yet another variation, the operation setpoint includes a duty cycle for the power switch.

In still another variation, the power allocation schedule identifies, for each power unit, a designated power switch to be operated during the power unit.

In another variation, the plurality of power control systems provide power to a plurality of loads.

In one form, the present disclosure is directed toward a system including a plurality of power control systems communicably coupled to each other and form a power network. Each of the power control systems includes a power switch electrically coupled to a load and operable to provide power to the load, and a power controller configured to define a power allocation schedule for a power cycle using a dynamic load scheduling model based on a members list of the power network. The power cycle is divided into one or more power units. The power allocation schedule identifies one or more designated power control systems that are to provide power to the load during each of the one or more power units and is used to operate the power switch to provide power to the load at respective power identified by the power allocation schedule.

In one variation, each power controller of the power network is configured to receive a membership command identifying an unassociated power controller of an unassociated power control system to be part of the power network, at least one of the plurality of power controllers of the power network is configured to provide a current power unit number to the unassociated power controller. The current power unit number is indicative of a power unit of the power cycle currently being performed by the power network, and the unassociated power controller is configured to set a power unit counter of the unassociated power controller to the current power unit number to synchronize the unassociated power controller with the plurality of power controllers of the power network. The unassociated power controller becomes a member of the members list.

In another variation, each power controller of the power network is configured to add the unassociated power controller to the members list. The power allocation schedule for a subsequent power cycle includes the unassociated power controller as a member of the members list. Each power controller of the power network is further configured to receive a removal command from a requesting power controller of the power network. Additionally, each power controller of the power network is configured to remove the requesting power controller from the members list. The power allocation schedule for a subsequent power cycle does not include the requesting power controller.

In yet another variation, the dynamic load scheduling model is based on prefix sum methodology.

In still another variation, each power controller of the power network is further configured to transmit an operation setpoint for the power switch to other power controllers of the power network. The power allocation schedule is further defined based on the operation setpoint of each power switch of the power network.

In another variation, the operation setpoint includes a duty cycle for the power switch.

In yet another variation, the power allocation schedule identifies, for each power unit, a designated power switch of the power network to be operated during the power unit.

In still another variation, the power network is configured to provide power to a plurality of loads.

In one form, the present disclosure is directed toward a method of providing power via a plurality of power control systems forming a power network providing power to one or more loads, each power control system includes a power controller and a power switch operable by the power controller. The method includes defining, by each power controller of the power network, a power allocation schedule for a power cycle using a dynamic load scheduling model based on a members list of the power network. The power cycle is divided into a plurality of power units, and the power allocation schedule identifies one or more designated power switches from among the power switches of the power network to provide power to a load for each of the power units. The dynamic load scheduling model is based on prefix sum methodology. For the power cycle, the method includes providing power to the load by the one or more designated power control systems during a respective power unit based on the power allocation schedule.

In one variation, the method further includes transmitting, by each power controller of the power network, a duty cycle of the power switch to other power controllers of the power network. The power allocation schedule is further defined based on the duty cycle of the power switches of the power network.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
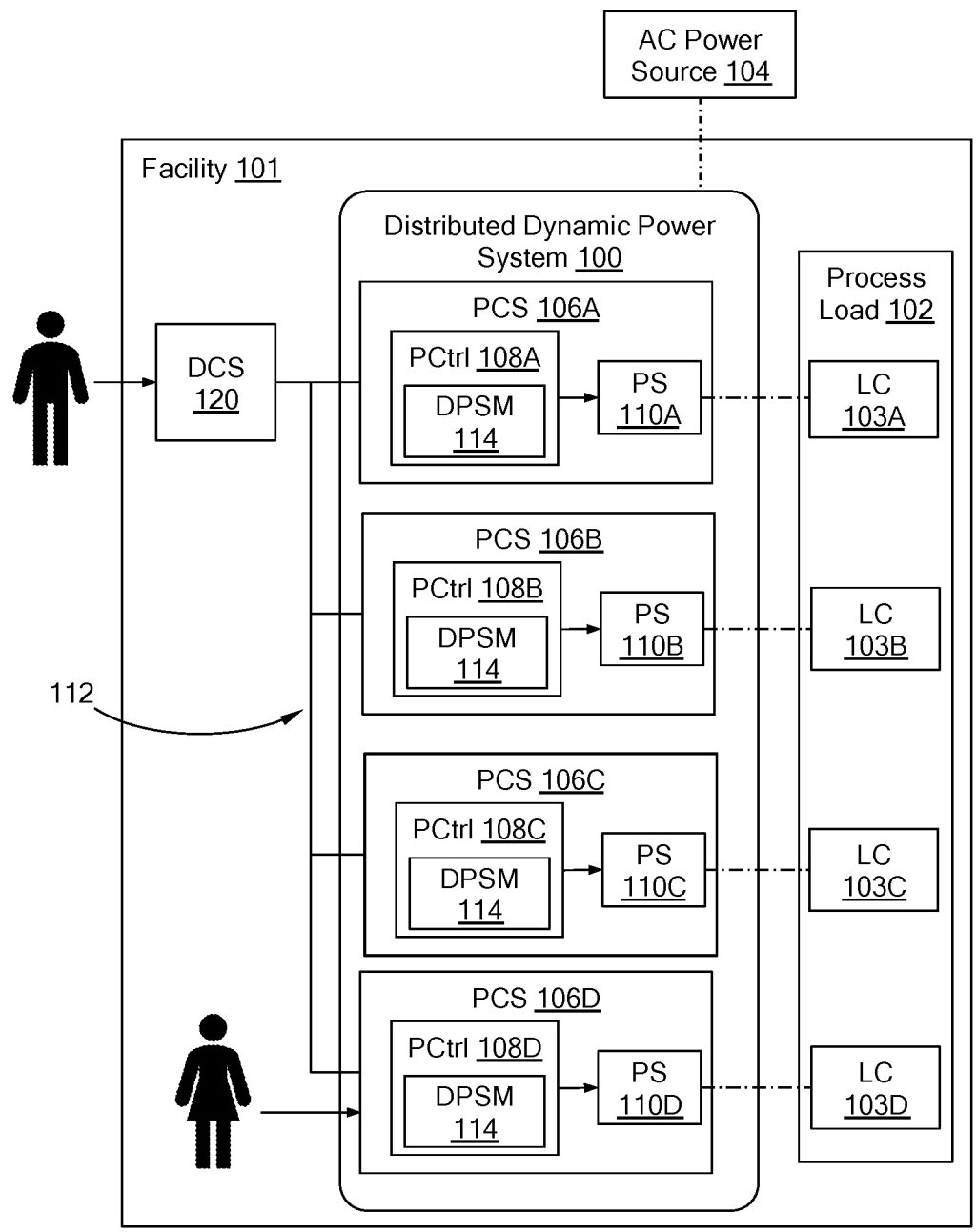
FIG. 1 is a block diagram of a distributed dynamic power system ("DDPS") in a facility in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed to a distributed dynamic power system having a plurality of power control systems that may form one or more power networks. Each power control system includes a power controller and one or more power switches operable by the power controller to provide power to a load. Each power controller is configured to include a dynamic load scheduling model that coordinates power delivery among the power control systems of the same power network. The power control systems dynamically adjust to add and/or remove members of its power network. The dynamic load scheduling model is configured to provide a customizable power allocation schedule based on the operation setpoint of the members of the power network. Accordingly, the distributed dynamic power system of the present disclosure coordinates power switching to reduce load fluctuations on the power system.

Referring to FIG. 1, a distributed dynamic power system 100 ("power system 100" hereinafter) of the present disclosure can be employed in a facility 101 to provide power from an AC power source 104 to a process load 102 (i.e., a load). For purposes of brevity, the AC power source 104 is generally illustrated to connect to the power system 100. In FIG. 1, dashed-dot lines represent power supply links.

The power system 100 includes a plurality of power control systems (PCS) 106A, 106B, 106C, and 106D (collectively "power control systems 106") that can form one or more power groups or power networks. In this example, each PCS 106 is electrically coupled to the process load 102 to provide power to the process load 102. In one form, the process load 102 includes multiple load circuits (LC) 103 (i.e., LC 103A, 103B, 103C, 103D) to receive power from the system 100.

In one form, each power control system 106 includes a power controller 108 (i.e., power controllers 108A, 108B, 108C, and 108D in FIG. 1) and one or more power switches 110 (i.e., power switches 110A, 110B, 110C, and 110D). For the sake of brevity, "power controller" is abbreviated as "PCtrl" and "power switch" is abbreviated as "PS" in the figures. In one form, the power controllers 108 are communicably coupled to each other by way of a communication network, which is generally represented by reference number 112. The communication network 112 may be a wired and/or wireless communication network. In one form, each power controller 108 includes a dynamic power scheduling model (DPSM) 114 for defining a power allocation schedule for a power cycle of the process load 102. In addition to performing the operations described herein, it should be readily understood that the power controllers 108 may be configured to perform other operations such as, but not limited to: storing data related to the operation/performance of the PCS 106 and/or the load 102; identifying faults of the PCS 106; and/or tracking occurrence of scheduled maintenance for the PCS 106.

Each power switch 110 is electrically coupled to a load circuit 103 of the process load 102 and each power controller 108 is configured to operate a respective power switch 110 to provide power to the respective load circuit 103 of the process load 102. More particularly, in an example application, each power switch 110 is operable in an OFF position to inhibit power from the power source 104 to be applied to the process load 102 and in an ON position to apply power from the power source 104 to the process load 102. Accordingly, in FIG. 1, the power controller 108A operates the power switch 110A, the power controller 108B operates the power switch 110B, the power controller 108C operates the power switch 110C, and the power controller 108D operates the power switch 110D. In one form, each power switch 110 is associated with a switch identification (ID) that uniquely identifies the power switch, which is stored by the power controller 108 electrically coupled to the power switch 110.

In one form, the facility 101 includes a distributed control system (DCS) 120 that is communicably coupled to the power control systems 106 and more particularly, the power controllers 108, by way of the communication network 112. The DCS 120 is provided as an interface accessible to users within or remote of the facility. In addition to or in lieu of the DCS 120, a user may interface with each power controller 108 via an interface provided at the PCS 106. For example, the interface (not shown in the figures) may be a computer in communication with the power controller 108, a touch screen display provided at the PCS 106 and in communication with the power controller 108, and/or other suitable interface accessible at the PCS 106.

As described further herein, each power controller 108 is configured to form a power network with itself or one or more other power controller 108. The power controllers 108 that form a power network are configured to operate in conjunction with each other to provide power to the process load 102, and each power controller is configured to track members of the power network it is part in a members list. More particularly, each power controller 108 is provided with a member ID that uniquely identifies the power controller 108. For example, the member ID and/or the switch ID may be an alphanumeric character string. In one form, the members list of a subject power controller 108 includes the member ID of each power controller 108 of the power network, the switch ID of each power switch 110 associated with each member ID, and an operation setpoint associated with each switch ID. It should be readily understood that the power controllers 108 can be configured in various suitable ways to store the members ID, switch ID, and operation setpoint, among other data. In a non-limiting example, the members ID may be stored in one cache memory and the switch ID may be stored in another. Accordingly, the term "members list" is not intended to limit how the data is actually stored, but just convey such data is stored in an organized manner.

In one form, each power controller 108 is configured to join a power network, synchronize with the power network, add another power controller 108 to the power network, and/or leave the power network. Accordingly, each power controller 108 is configured to create, update, and maintain a list of power controllers along with a list of power switches 110 that are part of its power network.

In one form, the power controllers 108 may receive membership commands that instruct the power controller 108 to perform a particular membership task. For example, the membership commands may include: a join command to have a subject power controller 108 join another power controller 108; a leave command to have the subject power controller 108 leave the power network it is part of; a group command to have the subject power controller 108 send its members list and member ID to another power controller 108 identified in the group command; a membership commend to have the subject power controller 108 add another power controller 108 (i.e., an unassociated power controller) identified in the membership command to the members list of the subject power controller 108; and/or a remove command to have the subject power controller 108 remove a power controller 108 identified in the command from the members list of the subject power controller 108. It should be readily understood that the power controllers 108 are configured to perform one or more of the membership commands described herein and is not required to perform all of the commands.

The membership commands may originate from the DCS 120, the interface at a respective PCS 106, the power controllers 108, and/or other suitable devices that manage power to the process load. In a non-limiting application, the DCS 120 may be configured to transmit the one or more membership commands based on a fault detection, a scheduled maintenance for a PCS 106 requiring the PCS 106 to go offline, increase/decrease performance of the process load, and/or inputs from a human user. For example, the DCS 120 may detect a fault at the process load 102 and issue a leave command to the power controller(s) 108 providing power to the process load. In another example, the DCS 120 may transmit the join command to a subject power controller 108 to have the subject power controller 108 join an identified power controller 108.

In another non-limiting application, the user may issue membership commands via the user interface at the PCS 106. For example, if the PCS 106A is to undergo a maintenance service, the user may place the PCS 106A offline by issuing a leave command to the PCS 106A to leave its power network. In another example, if the process load requires additional power, the user may issue a join command to have a PCS 106 that is an unassociated with a power network having other PCSs 106 (i.e., an unassociated PCS 106) join a power network supporting the process load 102.

In some instances, the membership commands originate from the power controller 108 itself. For example, if the power controller 108A receives a join command instructing it to join the power network that the power controller 108B is part of, the power controller 108A transmits the group command, which includes the members list and member ID of the power controller 108A, to the power controller 108B. In response to the group command, the power controller 108B transmits the members list and member ID of the power controller 108B to the power controller 108A to notify the power controller 108A of the members of the power network that the power controller 108B is part of. For example, if the power controller 108B is the only member of the power network, then the members list would only include the member ID of the power controller 108B. If the power network also includes the power controller 108C, the members list transmitted would include the member ID of the power controllers 108B and 108C. In response to the message from the power controller 108B, the power controller 108A transmits the membership command to each member of the power network that the power controller 108B is part of to have the members insert/add the power controller 108A to the members list. In one form, the insert command may include the member ID of the power controller 108A, the switch ID of the power switch 110A, and in some instances, an operation setpoint of the power switch 110A. Similarly, the power controller 108A updates it members list with the information of the members list of the power controller 108B. In another example, in response to receiving the join command, the power controller 108A may first determine if it already part of a power network by reviewing its members list. If the member ID of other power controllers 108 are provided, the power controller 108A may transmit a command indicating that it is already part of another power network to the sender of the join command.

In another example, if the power controller 108A is part of a power network and detects an abnormal operation at the PCS 106A or is going to be placed off-line due to a scheduled/unscheduled maintenance, the power controller 108A issues a leave command to itself and further transmits a remove command to members of the power network it is part of to have the other power controllers 108 remove the power controller 108A from their members list. The power controller 108A further clears its members list of the information related to the other power controllers 108.

While membership commands are described in association with power controller 108A, 108B, and 108C, it should be readily understood that the examples are applicable to all the power controllers 108 and are provided for explanation purposes only.

Once added, the subject power controller 108 becomes a peer of the power network and an associated power controller 108. The associated power controller 108 is configured to synchronizes its time cycle and power cycle with other power controllers 108 of the power network. In one form, the associated power controller 108 is configured to conduct a time synchronization with members of the power network via a network internal clock or an external clock. For example, each power controller 108 of the power network is configured to conduct an internal network clock synchronization, where each power controller 108 is configured to share its time cycle with other power controllers 108 of the power network. In response to the synchronization, each power controller 108 sets and adjusts their time to the same time. Alternatively, at least one designated power controller 108 and/or DSC 120 may conduct a time synchronization based on, for example, Coordinated Universal Time or Network Time Protocol such that other power controllers 108 may time sync with the designated power controller 108 and/or the DCS 120. In yet another form, all of the power controllers 108, regardless of whether they are part of the power network, is configured to conduct a time synchronization based on the Coordinated Universal Time (UTC) or the Network Time Protocol, such that each of the power controllers is independent and syncs to the external time source. While specific time synchronization methods are described, other time synchronization methods may be employed.

To conduct a power synchronization, the power controller 108 may request one or more members of the power network to provide a current power unit of a current power cycle, and sets its power unit counter equal to the same value as the power unit counter of the other power controller 108 of the power network.

Each power controller 108 of the power network is configured to define the power allocation schedule for a power cycle to determine when each power switch 110 is to be ON and OFF. More particularly, a power cycle is divided into a plurality of power units (e.g., 10 total units) and the power allocation schedule identifies one or more designated power switches from among the power switches of the power network to provide power during each of the power units. Each power controller 108 is configured to employ the DPSM 114 to define the power allocations schedule based on the number of power units and an operation setpoint of each power switch 110, such as a duty cycle of the power switch 110. Accordingly, during the power cycle, each power controller 108 is configured to identify designated power switch(es) 110 in the power allocation schedule to provide power to the process load during respective power units. The power unit may also be referred to as a power time unit.

Figure 2:
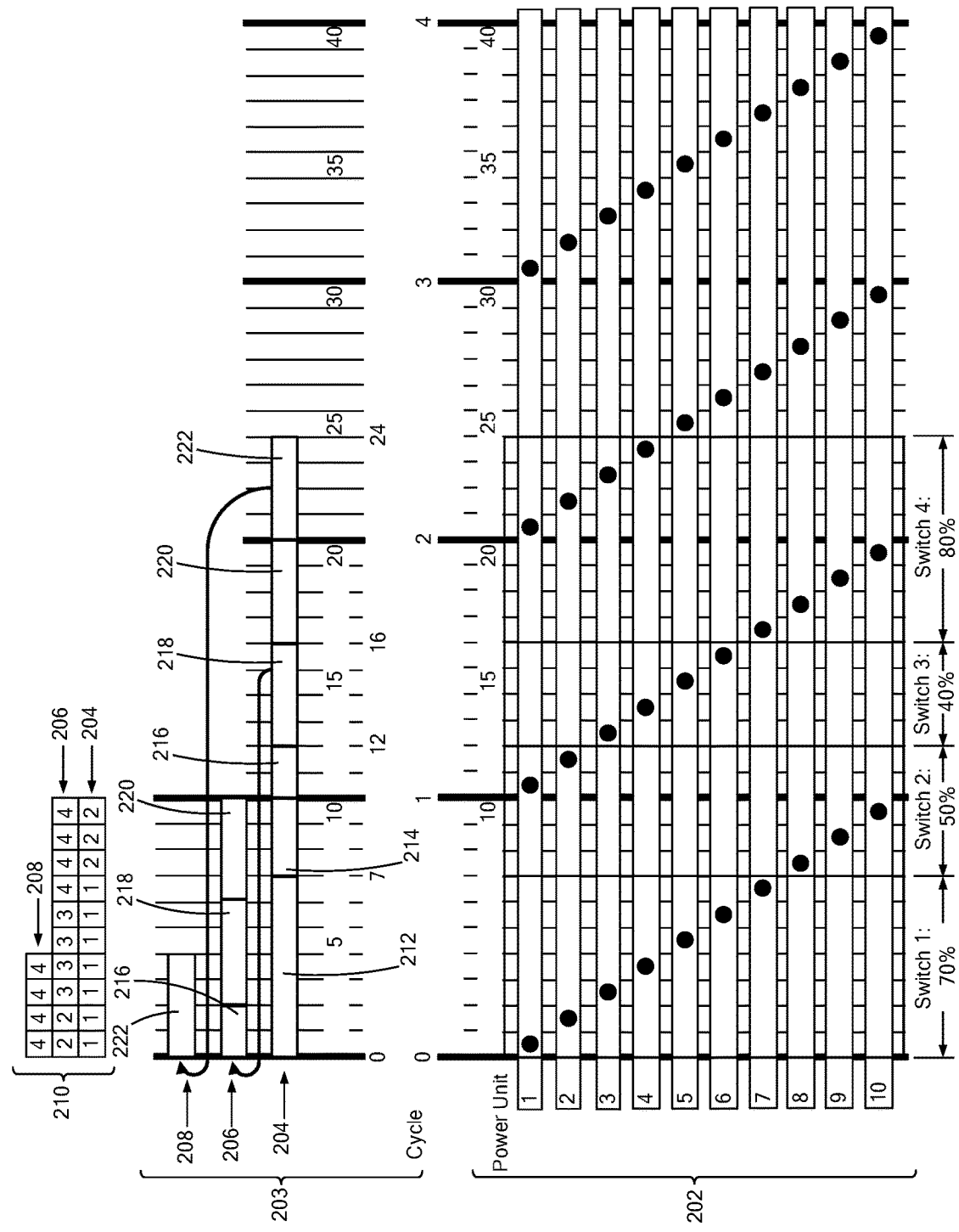
FIG. 2 illustrates a power cycling diagram of the DDPS using a dynamic power scheduling model in accordance with the teachings of the present disclosure.

In one form, the DPSM 114 is based on a prefix sum methodology. By way of explanation, referring to FIGS. 1 and 2, a power network includes PCSs 106A, 106B, 106C, and 106D, which thus includes the power switches 110A, 110B, 110C, and 110D. In FIG. 2, switch 1 represents power switch 110A, switch 2 represents power switch 110B, switch 3 represents the power switch 110C, and switch 4 represents power switch 110D, and switches 1, 2, 3, and 4 have a duty cycle (e.g., a setpoint) of 70%, 50%, 40%, and 80%, respectively. In one form, a power cycle is chosen to be a number of time units, therefore an ON time for each switch 1, 2, 3, 4 is equal to the power cycle multiplied by the duty cycle. It should be readily understood that the operation setpoints can be any suitable value and should not be limited to the examples provided herein. For example, one or more power switches of the power network may have the same duty cycle.

In this example, a single power cycle is divided into 10 time units, and thus, switch 1 is to be ON for 7 power units, switch 2 is to be on for 5 power units, switch 3 is to be on for 4 power units, and switch 4 is to be on for 8 power units, which is a total of 24 power units if the power switches 110 were to operate one after each other, (generally represented by a consecutive power chart 202). Using prefix sum, the 24 power units are managed into 10 units by stacking the 24 power units within 10 units. For instance, as illustrated in a stack power portion 203 of FIG. 2, the 24 power units are grouped by 10 power units such that: the 7 units of switch 1 having a 70% duty cycle (represented by reference number 212) and 3 units of switch 2 having a 30% duty cycle (represented by reference number 214) form a first 10 power unit group (represented by reference number 204); the remaining 2 units of switch 2 having a 20% duty cycle (represented by reference number 216), 4 units of switch 3 having a 40% duty (represented by the reference number 218), and 4 units of switch 4 having a duty cycle of 40% (represented by the reference number 220) form a second 10-unit group (represented by reference number 206), and the remaining 4 units of switch 4 having a duty cycle of 40% (represented by reference number 222) carryovers to a third 10-unit group (represented by referenced number 208). From here, the three groups of 10 units are stacked such that the second group is positioned over the first group, and the third group over the second to provide a power allocation schedule 210. Accordingly, for the ten power units: switches 1, 2, and 4 are to be ON at power units 1 and 2; switches 1, 3, and 4 are to be ON at power units 3 and 4; switches 1 and 3 are to be ON at power units 5 and 6; switches 1 and 4 are to be ON at power unit 7; and switches 2 and 4 are to be ON at power units 8, 9, and 10. Accordingly, using the DPSM 114, each power controller 108 of the power network determines the power allocation schedule for the power network and then operates a respective power switch 110 based on the schedule.

The power system 100 is configured to include four PCSs 106, where each PCS 106 includes one power switch 110. In addition, the PCSs 106 are illustrated as providing power to the same process load. As described herein, the PCS of the present disclosure can be configured to include more than one power switch and the power system can be configured to provide power to different process loads.

Figure 3:
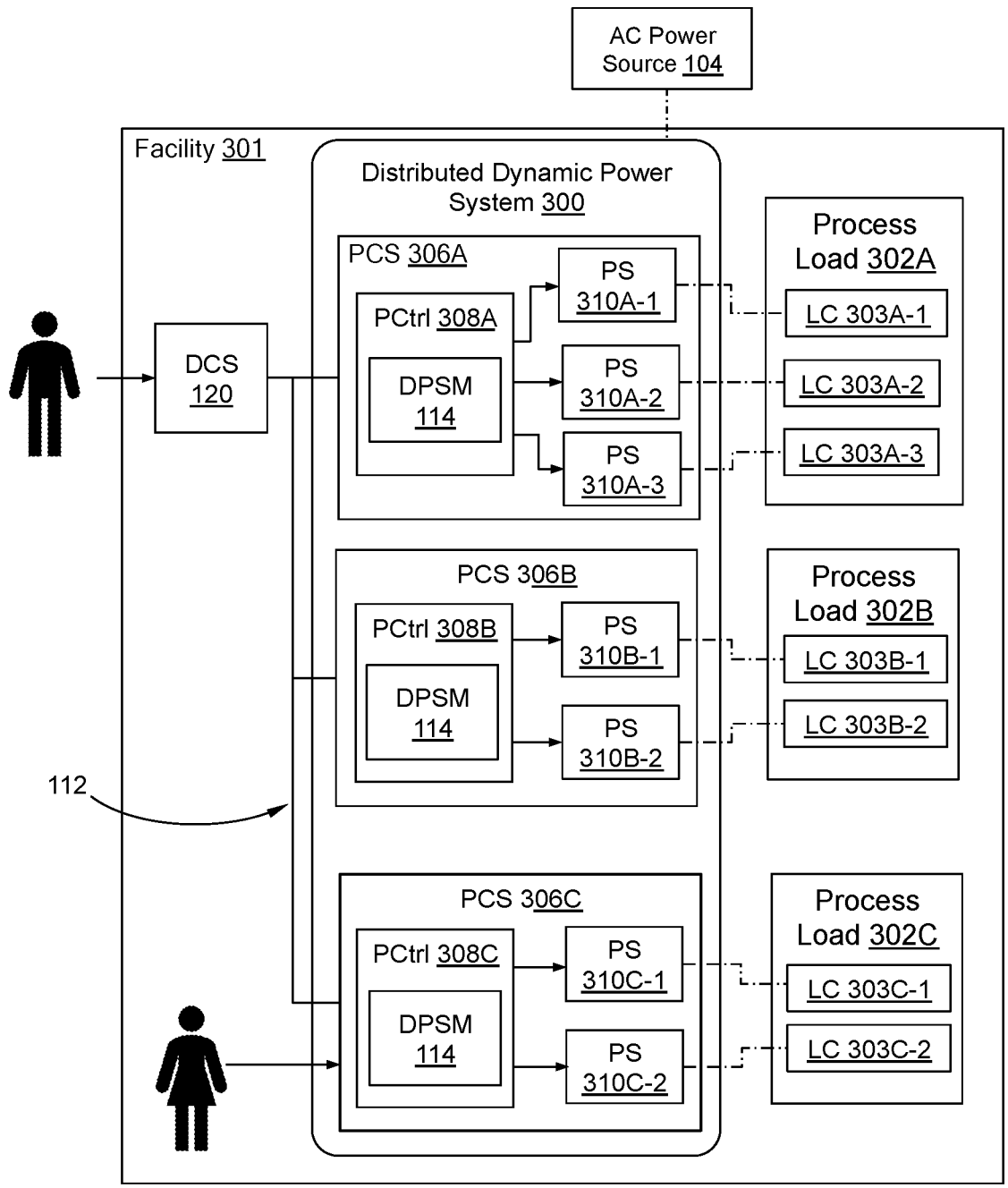
FIG. 3 is a block diagram of an alternative form of the DDPS in accordance with the teachings of the present disclosure.

In one form, referring to FIG. 3, a power system 300 provides power to multiple process loads 302A, 302B, and 302C (collectively "process loads 302"). The process load 302A includes three load circuits 303A-1, 303A-2, and 303A-3 (collectively "load circuits 303A"). The process load 302B includes two load circuits 303B-1 and 303B-2 (collectively "load circuits 303B"). The process load 302C includes two load circuits 303C-1 and 303C-2 (collectively "load circuits 303C"). The load circuits 303A, 303B and 303C may collectively be referred to as load circuits 303.

The power system 300 includes a plurality of PCSs 306A, 306B, and 306C (collectively "power control systems 306"), like PCSs 106, each PCS 306 includes a power controller 308 (i.e., power controllers 308A, 308B, and 308C). In this example, each PCS 306 includes multiple power switches. More particularly, the PCS 306A includes three power switches 310A-1, 310A-2, 310A-3 (collectively "power switches 310A") that are electrically coupled to the load circuits 303A. The PCS 306B includes two power switches 310B-1 and 310B-2 (i.e., collectively "power switches 310B") that are electrically coupled to the load circuits 303B. The PCS 306C includes two power switches 310C-1 and 310C-2 (collectively "power switches 310C") that are electrically coupled to the load circuits 303C. The power switches 310A, 310B, and 310C may collectively be referred to as "power switches 310", and the power switches 310 are operable in a similar manner as that of power switches 110 to provide power to the respective load circuits 303.

The power controllers 308 are configured in a similar as the power controllers 108 to, at least: manage members list based on the membership commands; generate the power allocation schedule using the DPSM; and operating respective power switches based on the power allocation schedule. Accordingly, details provided above regarding the management of the members list and operation of the power switches is also applicable in system 300. In addition, details regarding the DPSM 114 provided above is also applicable here, with the difference being in the number of power switches 310 accounted for in the power allocation schedule. For example, if the power controllers 308A and 308B form a power network, the power controller 308A provides information regarding its member ID, the switch ID(s) of the power switches 310A and the operation setpoint of the power switches 310A to the power controller 308B, and the power controller 308B does the same. The power allocation schedule is then generated for the five power switches 310A and 310B.

The power system (100, 300) having the PCS (106, 306) of the present disclosure can be configured in various suitable way for providing power to the process loads (102, 302). For example, in FIG. 3, a PCS having a power controller and four power switches can be provided to control power to the process loads 302B and 302C, and may form a power network with the PCS 306A. In another example, the PCS 306A may include two power switches 306A and a newly added PCS that includes one power switch may together provide power to the process load 302A. Accordingly, the number of power switches provided in a PCS, the configuration of the process loads, and/or the grouping of PCSs that form a power network should not be limited to drawings or specific examples provided herein. By using the power controllers (108, 308) with the DPSM 114 of the present disclosure, each power controller is configured to process various membership commands to manage its members list and use the DPSM 114 to determine a power allocation schedule that is synchronized and the same as other members of the power network.

Figure 4:
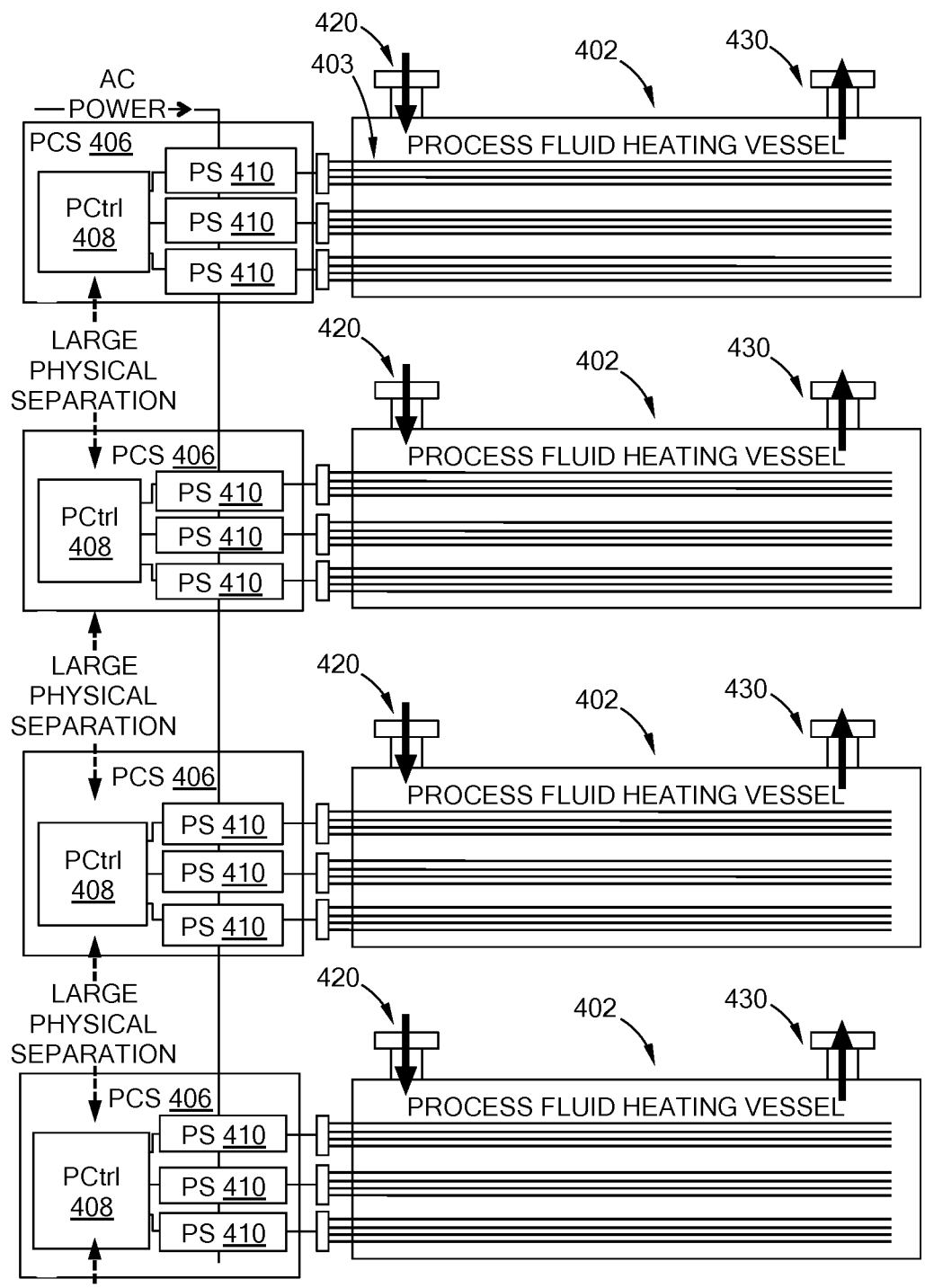
FIG. 4 is an illustrative diagram of one form of the DDPS with each process load as a fluid flow system in accordance with the teachings of the present disclosure.

Referring to FIG. 4, an example application of a power system having the PCSs of the present disclosure is employed in a fluid flow system. In this example, multiple fluid heating vessels 402 (i.e., process loads) include multiple heating element circuits 403 (i.e., load circuits). In operation, fluid enters through an inlet port 420, is heated by the heating element circuits 403 and exits out through an outlet port 430. In one form, the fluid heating vessels 402 can be distributed with large physical separation. This is intended to illustrate that the PCSs of the present disclosure are not limited by distance and may form a power network to coordinate power delivery.

In this example, a power system 400 includes four PCSs 406, where each PCS 406 includes a power controller 408 and three power switches 410. While not illustrated, each power controller 408 includes the DPSM of the present disclosure. Each PCS 406 is electrically coupled to a single fluid heating vessel 402, where the power switches 410 are electrically coupled to the heating element circuits 403 and operable by the power controller 408 to provide power to the heating element circuit 403 from the AC power. The PCSs 406 are configured in a similar manner as the PCS 106, 306, and thus, the power controllers 408 and the power switches 410 are configured in a similar manner as the power controller 108, 308 and power switches 110, 310, respectively. Accordingly, one or more power networks may be formed by the PCSs 406 to manage power to the heaving vessels 402. It should be readily understood that the number of PCSs used for providing power to the heating vessels should not be limited to four and may include two or more PCSs. In addition, the number of power switches provided at each PCS should not be limited to three and may include one or more power switches. While a specific application is described herein, it should be readily understood that the teachings of the present disclosure can be applied to other suitable application and should not be limited to fluid flow systems.

Figure 5:
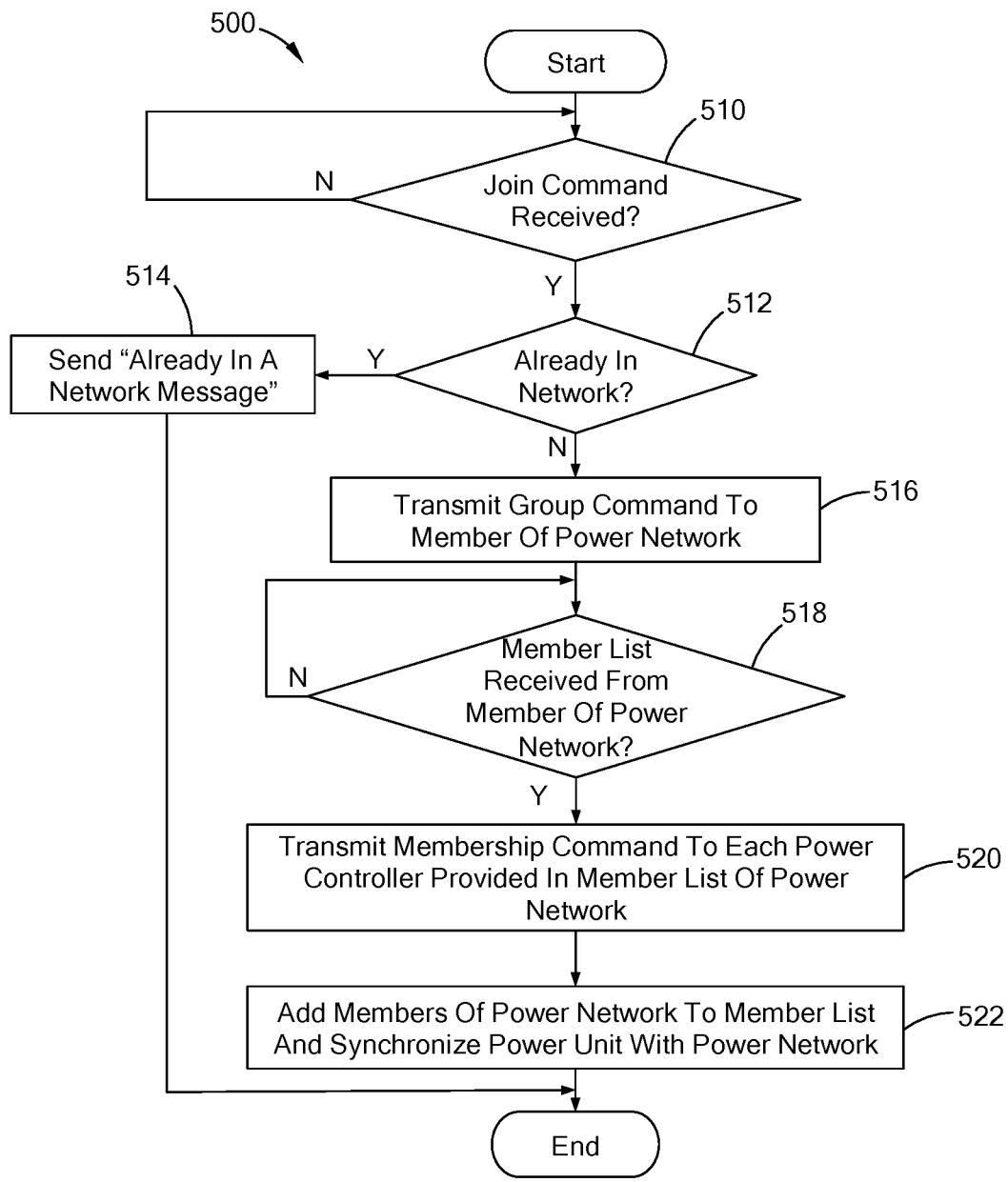
FIG. 5 is flowchart of a network membership routine for adding an unassociated power controller to a power network in accordance with the teachings of the present disclosure.

Referring to FIG. 5, a network membership routine 500 for joining a power network is provided. At 510, a subject power controller determines whether a join command is received. At 512, the subject power controller determines whether it is already in a power network. For example, the subject power controller checks its members list to see if member IDs for other power controllers are provided. If yes, the subject power controller determines it is in a power network, at 514 and the process ends. In another variation, the subject power controller may transmit a message to the sender of the join command notifying them the subject power controller is already a member of the power network. At 514, if there are no member IDs, then the subject power controller is an unassociated power controller to be added to the power network identified in the join command. At 516, the subject power controller transmits a group command to a member of the power network. For example, the join command may provide the member ID of the power controller that the subject power controller is to join and the subject power controller transmits the group command to the power controller identified. In one form, the group command includes a request for the member of the power network to send their members list and includes information related to the subject power controller such as, but not limited to, member ID.

At 518, the subject power controller determines if a members list is received from the member of the power network. If not, the subject power controller waits until it is received. If received, the subject power controller transmits a membership command to each power controller provided in the members list of power network, at 520. The membership command requests the power controller of the power network to add the subject power controller to their members list. In one form, the membership command includes the member ID of the subject power controller, switch ID of the power switch(es) connected to the subject power controller, and an operation setpoint of the power switch. In one variation, the membership command only includes the member ID and the other information is provided in a separate message. At 522, the subject power controller updates its members list with the data received from the members list provided by the member of the power network, and thus can include member ID(s), switch ID(s), and operation setpoint (s). The subject power controller may also synchronize its power unit counter with the other members of the power network.

Figure 6:
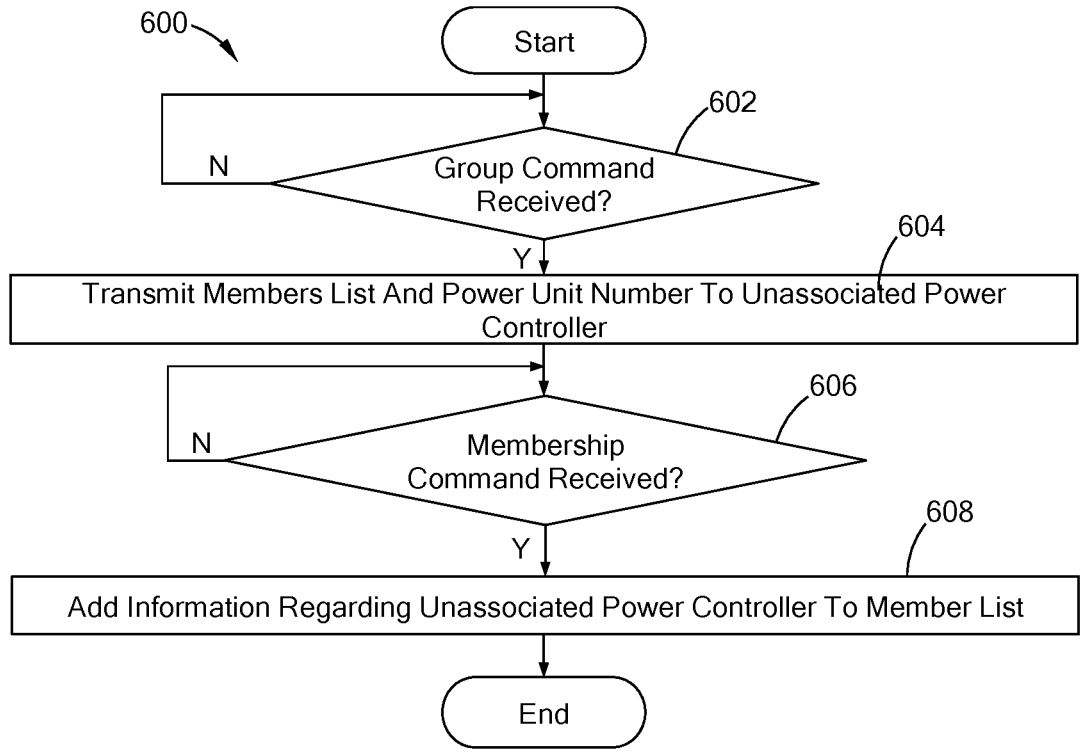
FIG. 6 is a flowchart of a member update routine for having a power controller add a requesting power controller in accordance with the teachings of the present disclosure.

With reference to FIG. 6, an example member update routine 600 is provided. As used herein, "an associated power controller" is a power controller that receives a request from an unassociated power controller to be added to the power network. At 602, the associated power controller determines if a group command is received and waits until one is received. If received, at 604, the associated power controller transmits its members list and, in some instances, a current power unit number to the unassociated power controller. Alternatively, the power unit number is provided in another message. At 606, the associated power controller determines if a membership command is received from the unassociated power controller and waits until one is received. If received, the associated power controller adds information from the membership command regarding the unassociated power controller to its members list making the unassociated power controller a member of the power network and an associated power network. The information may include the member ID, power switch ID, and operation setpoint.

Figure 7:
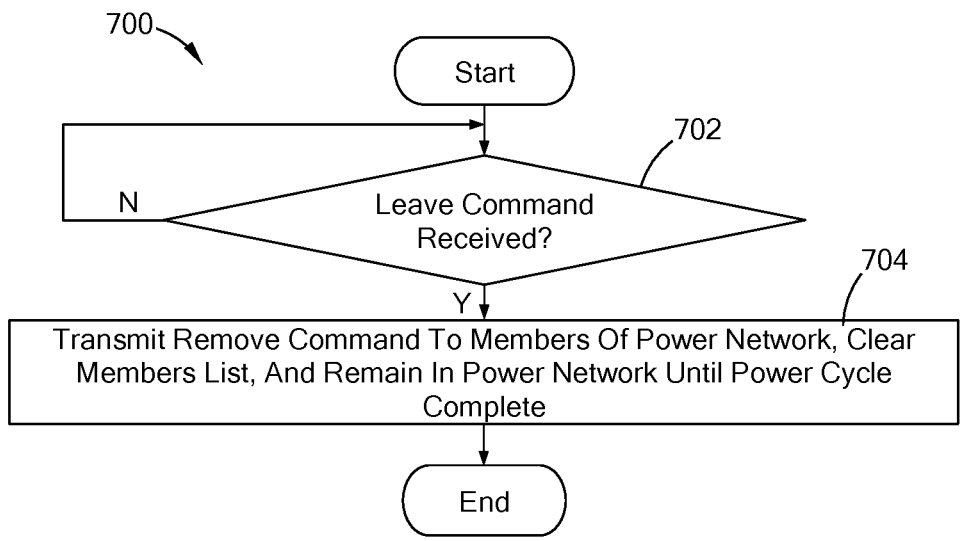
FIG. 7 is a flowchart of a network exit routine for leaving a power network in accordance with the teachings of the teachings of the present disclosure.

Referring to FIG. 7, an example network exit routine 700 is provided. At 702, the associated power controller of a power network determines if a leave command is received. In one form, the leave command may be provided by an external source or may be provide by another program of the associated power controller. If the leave command is received, the associated power controller transmits a remove command to members of the power network and clear its members list. In response to receiving the remove command, the members of power network remove the associated power controller that transmitted the leave command from the members list.

It should be readily understood that routines 500, 600, and 700 are just example routines for the various membership commands and other suitable routines may be employed.

Figure 8:
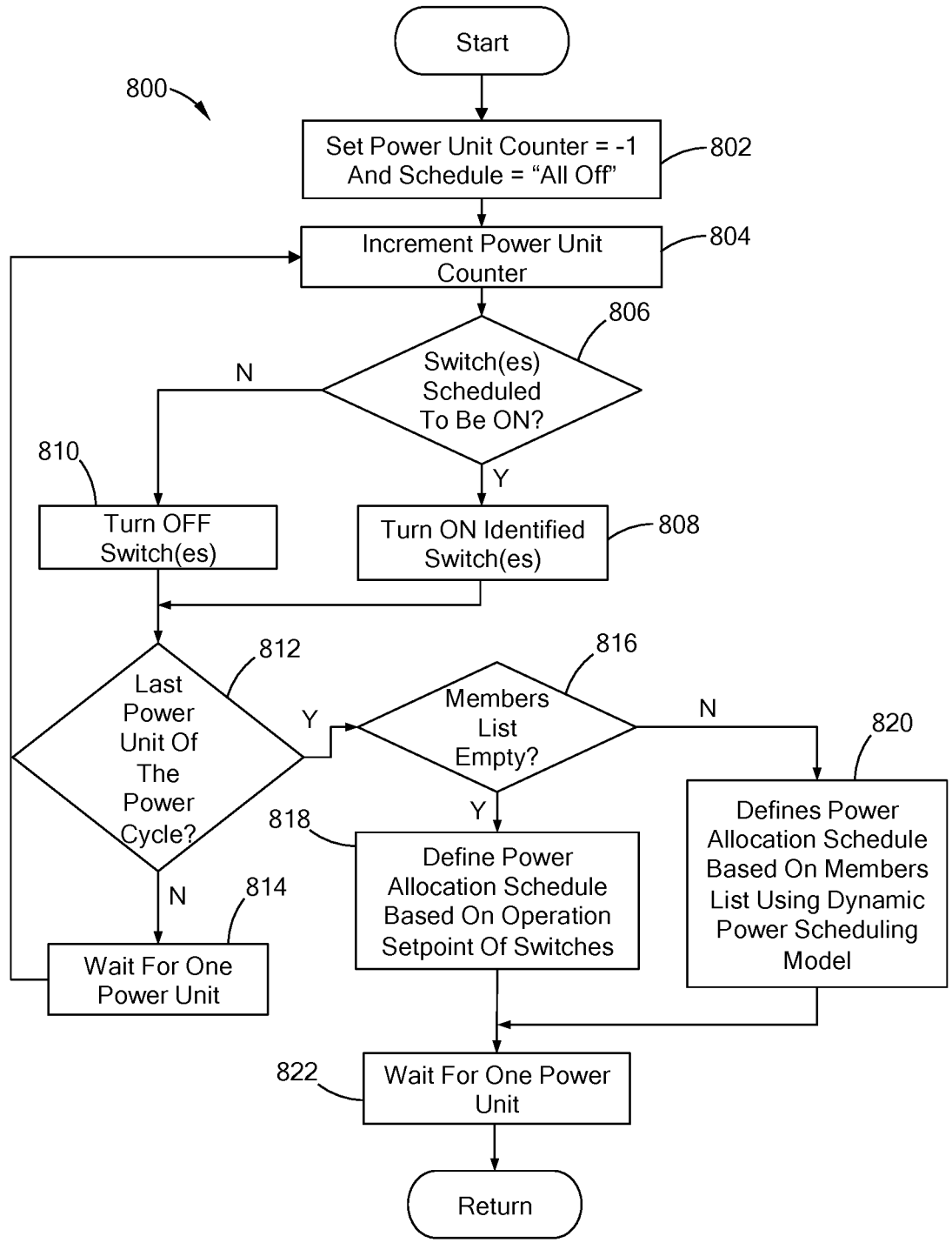
FIG. 8 is a flowchart of power control routine in accordance with the teachings of the present disclosure.

Referring to FIG. 8, an example of a power control routine 800 executed by a power controller of a power network is provided and starts at the beginning of a power cycle. At 802, the power controller resets the power unit counter, which tracks the power unit being executed during the power cycle. At 804, the power controller increments the power unit counter. At 806, the power controller reviews the power allocation schedule to determine and identify if at least one of its respective power switches is ON during the current power unit. If yes, the power controller turns ON one or more identified power switches at 808 (i.e., "Turn ON identified Power Switches") and if no, the power controller has the power switches in OFF position, at 810 (i.e., "Turn OFF switches").

At 810, the power controller determines if it is the last power unit. If no, the power controller waits for one power unit at 814 and returns to 804. If it is at the last power unit, the power controller determines a power allocation schedule for the next power cycle. For instance, the power controller determines if its members list is empty, at 816. That is, the power controller determines if it is part of a power network. If the members list is empty, the power controller defines the power allocation schedule for the next power cycle based on the operation setpoint (e.g., duty cycle) of the power switches it is coupled to, at 818. If the members list is not empty, the power controller, at 820, defines the power allocation schedule for the next power cycle based on the dynamic power scheduling model. Accordingly, if the members list changes during the power cycle, the updated are taken into consideration for defining the power allocation schedule for the next power cycle. The power controller then waits for one power unit, the last power unit, at 822 and then returns to the beginning of the routine 800 for the start of the new power cycle.

The power control routine 800 of FIG. 8 is just one way for performing the power control routine and other suitable routines may also be used. For example, in one form, the power controller may be configured to provide a ramp up or a ramp down of power by employing an entry que and/or an exit que that gradually adds or removes power controllers from the group at different power cycles.

The distributed dynamic power system of the present disclosure coordinates power switching by multiple PCSs to reduce load fluctuations on the power system without the use of master controller for driving each power controller of the PCS. Specifically, each power controller stores and employs the dynamic load scheduling model that coordinates power delivery among the PCSs of the same power network. Accordingly, the PCS dynamically adjust to add and/or remove members to its power network. In addition, the dynamic load scheduling model provides a customizable schedule based on the operation setpoint of the PCSs, which may be different.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C." As used herein, a "plurality" should be construed as meaning two or more.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of providing power via a plurality of power control systems forming a power network, each power control system includes a power controller and a power switch operable by the power controller, the method comprising:
   defining, by each power controller of the power network, a power allocation schedule for a power cycle using a dynamic load scheduling model based on a members list of the power network, wherein the power cycle is divided into a plurality of power units, and the power allocation schedule identifies one or more designated power control systems from among the plurality of power control systems to provide power to a load during each of the power units; and
   for the power cycle, providing power to the load by the one or more designated power control systems during a respective power unit based on the power allocation schedule.

2. The method of claim 1 further comprising:
   receiving, by each power controller of the power network, a membership command identifying an unassociated power controller to be part of the power network;
   providing, by at least one power controller of the power network, a current power unit number to the unassociated power controller, wherein the current power unit number is indicative of a power unit of the power cycle currently being performed by the power network; and
   setting, by the unassociated power controller, a power unit counter of the unassociated power controller to the current power unit number to synchronize the unassociated power controller with each power controller of the power network, wherein the unassociated power controller becomes a member of the members list.

3. The method of claim 2 further comprising adding, by each power controller of the power network, the unassociated power controller to the members list of the power network, wherein the power allocation schedule for a subsequent power cycle includes the unassociated power controller as a member of the members list.

4. The method of claim 1 further comprising:
   receiving, by each power controller of the power network, a removal command from a requesting power controller of the power network; and
   removing, by each power controller of the power network, the requesting power controller from the members list, wherein the power allocation schedule for a subsequent power cycle does not include the requesting power controller.

5. The method of claim 1, wherein the dynamic load scheduling model is based on prefix sum methodology.

6. The method of claim 1 further comprising transmitting, by each power controller, an operation setpoint to other power controllers of the power network, wherein the power allocation schedule is further defined based on the operation setpoint of each power controller.

7. The method of claim 6, wherein the operation setpoint includes a duty cycle for the power switch.

8. The method of claim 7, wherein the power allocation schedule identifies, for each power unit, a designated power switch to be operated during the power unit.

9. The method claim 1, wherein the plurality of power control systems provide power to a plurality of loads.

10. A system comprising:
    a plurality of power control systems communicably coupled to each other and form a power network, wherein
    each of the power control systems includes:
      a power switch electrically coupled to a load and operable to provide power to the load, and
      a power controller configured to
        define a power allocation schedule for a power cycle using a dynamic load scheduling model based on a members list of the power network, wherein the power cycle is divided into one or more power units, the power allocation schedule identifies one or more designated power control systems that are to provide power to the load during each of the one or more power units; and
        operate the power switch to provide power to the load at respective power units identified by the power allocation schedule.

11. The system of claim 10 wherein:
    each power controller of the power network is configured to receive a membership command identifying an unassociated power controller of an unassociated power control system to be part of the power network,
    at least one power controller of the power network is configured to provide a current power unit number to the unassociated power controller, wherein the current power unit number is indicative of a power unit of the power cycle currently being performed by the power network, and the unassociated power controller is configured to set a power unit counter of the unassociated power controller to the current power unit number to synchronize the unassociated power controller with each power controller of the power network, wherein the unassociated power controller becomes a member of the members list.

12. The system of claim 11, wherein each power controller of the power network is configured to add the unassociated power controller to the members list, wherein the power allocation schedule for a subsequent power cycle includes the unassociated power controller as a member of the members list.

13. The system of claim 10, wherein:

each power controller of the power network is further configured to receive a removal command from a requesting power controller of the power network, and each power controller of the power network is configured to remove the requesting power controller from the members list, wherein the power allocation schedule for a subsequent power cycle does not include the requesting power controller.

14. The system of claim 10, wherein the dynamic load scheduling model is based on prefix sum methodology.

15. The system of claim 10, wherein each power controller of the power network is further configured to transmit an operation setpoint for the power switch to other power controllers of the power network, wherein the power allocation schedule is further defined based on the operation setpoint of each power switch of the power network.

16. The system of claim 15, wherein the operation setpoint includes a duty cycle for the power switch.

17. The system of claim 15, wherein the power allocation schedule identifies, for each power unit, a designated power switch of the power network to be operated during the power unit.

18. The system claim 10, wherein the power network is configured to provide power to a plurality of loads.

19. A method of providing power via a plurality of power control systems forming a power network providing power to one or more loads, each power control system includes a power controller and a power switch operable by the power controller, the method comprising:

defining, by each power controller of the power network, a power allocation schedule for a power cycle using a dynamic load scheduling model based on a members list of the power network, wherein the power cycle is divided into a plurality of power units, and the power allocation schedule identifies one or more designated power switches from among the power switches of the power network to provide power to a load for each of the power units, wherein the dynamic load scheduling model is based on prefix sum methodology; and for the power cycle, providing power to the load by the one or more designated power switches during a respective power unit based on the power allocation schedule.

20. The method of claim 19 further comprising transmitting, by each power controller of the power network, a duty cycle of the power switch to other power controllers of the power network, wherein the power allocation schedule is further defined based on the duty cycle of the power switches of the power network.

* * * * *